US008245088B1

(12) United States Patent
Srinivas et al.

(10) Patent No.: US 8,245,088 B1
(45) Date of Patent: Aug. 14, 2012

(54) IMPLEMENTING QUALITY OF SERVICE (QOS) BY USING HYBRID ARQ (HARQ) RESPONSE FOR TRIGGERING THE EV-DO REVERSE ACTIVITY BIT (RAB)

(75) Inventors: Shilpa Kowdley Srinivas, Herndon, VA (US); Bhagwan Khanka, Lenexa, KS (US); Anoop K. Goyal, Overland Park, KS (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 620 days.

(21) Appl. No.: 12/494,999

(22) Filed: Jun. 30, 2009

(51) Int. Cl.
 *H04L 1/16* (2006.01)
(52) U.S. Cl. ........................................ 714/708
(58) Field of Classification Search ............ 714/708
 See application file for complete search history.

(56) References Cited

U.S. PATENT DOCUMENTS

| 5,649,299 | A | 7/1997 | Battin et al. |
| 5,995,923 | A | 11/1999 | Mermelstein et al. |
| 6,021,328 | A | 2/2000 | Curtis et al. |
| 6,148,207 | A | 11/2000 | Baum |
| 6,172,974 | B1 | 1/2001 | Tseng et al. |
| 6,243,590 | B1 | 6/2001 | Reddy et al. |
| 6,272,358 | B1 | 8/2001 | Brent et al. |
| 6,418,147 | B1 | 7/2002 | Wiedeman |
| 6,480,541 | B1 | 11/2002 | Girod et al. |
| 6,501,736 | B1 | 12/2002 | Smolik et al. |
| 6,591,110 | B1 | 7/2003 | Kim et al. |
| 6,606,496 | B1 | 8/2003 | Salvarani et al. |
| RE38,244 | E | 9/2003 | Han et al. |
| 6,625,119 | B1 | 9/2003 | Schuster et al. |
| 6,718,183 | B1 | 4/2004 | Blust et al. |
| 6,757,520 | B2 | 6/2004 | Attar et al. |
| 6,839,356 | B2 | 1/2005 | Barany et al. |
| 6,856,954 | B1 | 2/2005 | Su |
| 6,970,437 | B2 * | 11/2005 | Lott et al. ............... 370/318 |
| 6,980,523 | B1 | 12/2005 | Lipford et al. |
| 7,058,124 | B2 | 6/2006 | Koo |
| 7,099,283 | B2 | 8/2006 | Matta et al. |
| 7,120,447 | B1 | 10/2006 | Chheda et al. |
| 7,130,287 | B2 | 10/2006 | Nounin et al. |

(Continued)

FOREIGN PATENT DOCUMENTS

WO WO 2004/004249 A1 1/2004

(Continued)

OTHER PUBLICATIONS

U.S. Appl. No. 12/397,855, Non-Final Office Action dated Dec. 5, 2011.

(Continued)

*Primary Examiner* — Stephen M Baker

(57) ABSTRACT

Methods and systems are provided for implementing quality of service (QoS) by using Hybrid ARQ (HARQ) response for triggering the EV-DO reverse activity bit (RAB). In an embodiment, an access node provides service to a plurality of access terminals, the plurality including a select group of one or more access terminals. The access node detects that it has, over a time period, sent more than a threshold number of HARQ negative acknowledgements (NACKs) with respect to reverse-link communication of the select group, and responsively (1) sets the RAB for the first wireless coverage area and (2) instructs the select group of access terminals to ignore the RAB. The select group ignores the RAB, while the rest of the access terminals obey the RAB.

25 Claims, 2 Drawing Sheets

U.S. PATENT DOCUMENTS

| | | | |
|---|---|---|---|
| 7,130,311 | B2 | 10/2006 | Yavuz et al. |
| 7,142,562 | B2 | 11/2006 | Yavuz et al. |
| 7,245,915 | B2 | 7/2007 | Matta et al. |
| 7,328,027 | B1 | 2/2008 | Mangal |
| 7,406,319 | B2 | 7/2008 | Kostic et al. |
| 7,411,923 | B2 | 8/2008 | Attar et al. |
| 7,411,974 | B2 | 8/2008 | Attar et al. |
| 7,426,180 | B2 | 9/2008 | Xu |
| 7,426,395 | B2 | 9/2008 | Stephens |
| 7,440,431 | B2 | 10/2008 | Sindhushayana et al. |
| 7,474,627 | B2 | 1/2009 | Chheda et al. |
| 7,486,645 | B2 | 2/2009 | Li et al. |
| 7,496,058 | B2 * | 2/2009 | Kim et al. .................. 370/310.1 |
| 7,742,768 | B2 | 6/2010 | Liu et al. |
| 7,746,816 | B2 * | 6/2010 | Attar et al. ..................... 370/318 |
| 7,953,048 | B2 * | 5/2011 | Yoon et al. ..................... 370/335 |
| 8,040,803 | B1 * | 10/2011 | Pawar et al. .................. 370/231 |
| 8,107,438 | B1 * | 1/2012 | Singh et al. ................... 370/332 |
| 2002/0061749 | A1 | 5/2002 | Hunzinger |
| 2002/0191693 | A1 | 12/2002 | Nakagaki |
| 2003/0064741 | A1 | 4/2003 | Silva et al. |
| 2003/0072278 | A1 | 4/2003 | Wu et al. |
| 2003/0095551 | A1 | 5/2003 | Gotoh et al. |
| 2003/0117956 | A1 | 6/2003 | Lee |
| 2003/0129982 | A1 | 7/2003 | Perini |
| 2003/0195006 | A1 | 10/2003 | Choong et al. |
| 2004/0017860 | A1 | 1/2004 | Liu |
| 2004/0037291 | A1 | 2/2004 | Attar et al. |
| 2004/0057420 | A1 | 3/2004 | Curcio et al. |
| 2004/0109424 | A1 | 6/2004 | Chheda |
| 2004/0196852 | A1 | 10/2004 | Aksu et al. |
| 2004/0213182 | A1 * | 10/2004 | Huh et al. ..................... 370/332 |
| 2004/0218533 | A1 | 11/2004 | Kim et al. |
| 2005/0032522 | A1 | 2/2005 | Soong et al. |
| 2005/0052996 | A1 | 3/2005 | Houck et al. |
| 2005/0153695 | A1 | 7/2005 | Cho |
| 2005/0286440 | A1 | 12/2005 | Strutt et al. |
| 2006/0077994 | A1 | 4/2006 | Spindola et al. |
| 2006/0126509 | A1 | 6/2006 | Abi-Nassif et al. |
| 2006/0159045 | A1 | 7/2006 | Ananthaiyer |
| 2006/0182062 | A1 | 8/2006 | Sdralia et al. |
| 2006/0250953 | A1 | 11/2006 | Mooney |
| 2006/0252429 | A1 | 11/2006 | Chen et al. |
| 2006/0268764 | A1 * | 11/2006 | Harris ........................... 370/328 |
| 2006/0291383 | A1 | 12/2006 | Bi et al. |
| 2007/0060165 | A1 | 3/2007 | Black et al. |
| 2007/0109967 | A1 | 5/2007 | Ha |
| 2007/0177510 | A1 | 8/2007 | Natarajan et al. |
| 2007/0201438 | A1 | 8/2007 | Yoon et al. |
| 2007/0242702 | A1 | 10/2007 | Shim |
| 2008/0008093 | A1 | 1/2008 | Wang et al. |
| 2008/0049706 | A1 | 2/2008 | Khandekar et al. |
| 2008/0080414 | A1 | 4/2008 | Thubert et al. |
| 2008/0130495 | A1 | 6/2008 | Dos Remedios et al. |
| 2008/0137614 | A1 | 6/2008 | Kwon |
| 2008/0186846 | A1 | 8/2008 | Stephenson et al. |
| 2008/0247450 | A1 | 10/2008 | Alexander et al. |
| 2008/0280615 | A1 | 11/2008 | Vinayakray-Jani |
| 2009/0086629 | A1 | 4/2009 | Zhang et al. |
| 2009/0141683 | A1 | 6/2009 | Grinshpun et al. |
| 2009/0170547 | A1 | 7/2009 | Raghothaman et al. |
| 2009/0257361 | A1 | 10/2009 | Deshpande et al. |
| 2009/0285159 | A1 | 11/2009 | Rezaiifar |
| 2010/0014487 | A1 * | 1/2010 | Attar et al. ..................... 370/335 |
| 2010/0296407 | A1 | 11/2010 | Medvedev et al. |
| 2010/0309861 | A1 | 12/2010 | Gorokhov et al. |

FOREIGN PATENT DOCUMENTS

| | | |
|---|---|---|
| WO | 2004/028095 | 4/2004 |

OTHER PUBLICATIONS

First Action Interview Pilot Program Pre-Interview Communication from U.S. Appl. No. 11/746,229, mailed Dec. 30, 2009.
Pre-Interview Communication mailed on Dec. 30, 2009 in U.S. Appl. No. 11/746,229.
First Action Interview Summary mailed on Jun. 2, 2010 in U.S. Appl. No. 11/746,229.
Notice of Allowance mailed on Aug. 3, 2010 in U.S. Appl. No. 11/746,229.
Non-Final Office Action mailed on Oct. 12, 2010 in U.S. Appl. No. 12/397,855.
Final Office Action mailed on Apr. 1, 2011 in U.S. Appl. No. 12/397,855.
Non-Final Office Action mailed on Mar. 22, 2011 in U.S. Appl. No. 12/141,569.
Non-Final Office Action mailed on Jun. 22, 2010 in U.S. Appl. No. 12/350,694.
Final Office Action mailed on Dec. 9, 2010 in U.S. Appl. No. 12/350,694.
Non-Final Office Action mailed on Feb. 18, 2011 in U.S. Appl. No. 12/350,694.
Unpublished U.S. Appl. No. 12/141,569, filed Jun. 18, 2008 entitled "Method for Initiating Handoff of a Wireless Access Terminal Based on the Reverse Activity Bit".
Unpublished U.S. Appl. No. 11/746,229, filed May 9, 2007 entitled "Using VoIP-Quality Metrics to Dynamically Adjust the EV-DO Reverse Activity Bit".
Unpublished U.S. Appl. No. 12/350,694, filed Jan. 8, 2009 entitled "Using Packet-Transport Metrics for Call-Admission Control".
Unpublished U.S. Appl. No. 12/397,855, filed Mar. 4, 2009 entitled "Using Packet-Transport Metrics for Setting DRCLocks".
Unpublished U.S. Appl. No. 12/432,736, filed Apr. 29, 2009 entitled "Using DRCLocks for Conducting Call Admission Control".
Unpublished U.S. Appl. No. 12/507,913, filed Jul. 23, 2009 entitled "Achieving Quality of Service (QoS) by Using the Reverse Activity Bit (RAB) in Creation of Neighbor Lists for Selected Access Terminals".
U.S. Appl. No. 12/388,199, filed Feb. 18, 2009.
U.S. Appl. No. 12/478,318, filed Jun. 4, 2009.
U.S. Appl. No. 12/538,624, filed Aug. 10, 1999.
U.S. Appl. No. 12/756,629, filed Apr. 8, 2010.
U.S. Appl. No. 12/731,895, filed Mar. 25, 2010.
U.S. Appl. No. 11/746,229, Interview Summary dated Apr. 6, 2010.
U.S. Appl. No. 12/388,199, Non-Final Office Action dated Mar. 30, 2011.
U.S. Appl. No. 12/478,318, Non-Final Office Action dated Dec. 8, 2010.
Ferrus, R. et al., "Evaluation of a Cell Selection Framework for Radio Access Networks considering Blackhaul Resource Limitations," The 18th Annual IEEE International Symposium on Personal, Indoor and Mobile Radio Communications (PIMRC'07).
Mino, E. et al., "IST-4-027756 Winner II, D4.8.3, Integration of Cooperation on WINNER II System Concept," Information Society Technologies, pp. 1-102, Nov. 29, 2007.
Conklin, G. et al., "Video Coding for Streaming Media Delivery on the Internet," IEE Transactions on Circuits and Systems for Video Technology, 11(3):269-281 (Mar. 2001).
International Search Report and Written Opinion from International Application No. PCT/US2007/009296, dated Oct. 17, 2007.
Liu, Xiu et al., "Experiences in a 3G Network: Interplay between the Wireless Channel and Applications," MobiCom'08, pp. 211-222 (Sep. 14-19, 2008).
Yeo, Woon-Yong et al., "Traffic Management of High-Speed CDMA Systems Base on Loan Prediction," IEICE Electronics Express, 6(7):389-394 (Apr. 10, 2009).
3rd Generation Partnership Project 2, "cdma2000 High Rate Packet Data Air Interface," 3GPP2 C.S0024-0, v. 4.0 (Oct. 2002).
3rd Generation Partnership Project 2, "cdma2000 High Rate Packet Data Air Interface," 3GPP2 C.S0024-A, v. 3.0 (Sep. 2006).
Notice of Allowance for U.S. Appl. No. 12/350,694 dated Jun. 10, 2011.
U.S. Appl. No. 12/141,569, Notice of Allowance dated Sep. 28, 2011.
U.S. Appl. No. 12/388,199, Final Office Action dated Oct. 11, 2011.
U.S. Appl. No. 12/478,318, Non-Final Office Action dated Oct. 27, 2011.

* cited by examiner

IMPLEMENTING QUALITY OF SERVICE (QOS) BY USING HYBRID ARQ (HARQ) RESPONSE FOR TRIGGERING THE EV-DO REVERSE ACTIVITY BIT (RAB)

BACKGROUND

1. Cellular Wireless Networks and EV-DO Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1 xRTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

Recently, service providers have introduced mobile stations and wireless networks that communicate using a CDMA protocol known as EV-DO, which stands for "Evolution Data Optimized." EV-DO networks, operating in conformance with one or more releases and/or revisions of industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some "hybrid" mobile stations can communicate with both 1× networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a BSC in 1× networks. The access node also includes one or more BTSs, each including one or more antennas that radiate to define respective wireless coverage areas such as cells and sectors. Note that sectors are used in the balance of this written description as an example of a wireless coverage area, though this is for explanation and not to the exclusion of cells or other coverage areas. Among other functions, the RNC controls one or more BTSs, and acts as a conduit between the BTSs and a PDSN, which provides access to a packet-data network. Thus, when positioned in a sector provided by an access node, an access terminal may communicate over the packet-data network via the access node and the PDSN.

2. Reverse Noise Rise

In general, in a given sector, an access node can provide service to access terminals on one carrier frequency (i.e. carrier), or on more than one. Furthermore, interference can be, and often is, present on a carrier in a sector. As used herein, an instance of a given carrier in a given sector may be referred to as a sector-carrier. In general, on a sector-carrier, an access node receives transmissions from access terminals operating on that sector-carrier. However, the access node often also receives transmissions on that sector-carrier from other access terminals, other devices, and/or any other sources of interference on that frequency.

At a given moment, the sum total of what an access node is receiving on a given sector-carrier is known as the "reverse noise" on that sector-carrier. At regular intervals, and in fact quite frequently (e.g., once for every forward-link timeslot (i.e. once every approximately 1.67 ms)), access nodes compute a value known as "reverse noise rise" (RNR), which is the difference between (i) the reverse noise that the access node is currently detecting and (ii) a baseline level of reverse noise. Thus, the access node computes how far the reverse noise has risen above that baseline.

To determine the baseline, EV-DO networks typically periodically utilize what is known as a silent interval, which may occur on the order of once every five minutes, and last on the order of 40-100 ms, both of which are typically configurable. During the silent interval, access terminals know not to transmit anything to the access node. The access node can then measure whatever else is out there. As such, the baseline corresponds to the amount of reverse noise when the sector-carrier is unloaded (i.e. without any transmitting access terminals). Note that other reverse-link-noise levels could be used as a baseline.

In general, the lower the RNR is at a given moment, the more favorable the RF conditions are for communication between access terminals and the access node at that moment. Correspondingly, the higher the RNR, the less favorable the RF conditions are. Also, a low RNR generally corresponds to a sector-carrier being lightly loaded, in other words that is supporting communications for a relatively low number of access terminals. A high RNR, as one might expect, generally corresponds to a sector-carrier being heavily loaded, in other words that is supporting communications for a relatively high number of access terminals.

3. Reverse Activity Bit (RAB)

Access nodes typically use the calculated value of RNR to, among other things, set or clear what is known as the Reverse Activity Bit (RAB), which is a value that the access node makes equal to 0 or 1, and repeatedly transmits to all the access terminals operating on a given sector-carrier. Note that making the RAB equal to 0 is known as "clearing" the RAB, while making the RAB equal to 1 (one) is known as "setting" the RAB. As stated, the access node typically calculates RNR at the same frequency at which it transmits forward-link timeslots, or once every 1.67 ms. The access node typically sets or clears the RAB at this same frequency.

With respect to how the access node chooses whether to set or clear the RAB, if the RNR is above a threshold (the "RNR threshold"), which is a configurable parameter that may be between 0 dB and 30 dB, the access node sets the RAB. If the RNR is below the RNR threshold, the access node clears the RAB. The access node transmits the RAB in a TDM channel—known as the reverse-activity channel—on the forward link. That channel is itself a TDM portion of a forward-link channel known as the Media Access Control (MAC) channel. Note that the RAB is the same for all access terminals on a sector-carrier. The manner in which those access terminals use the value of the RAB is explained below.

4. Access Terminals Using the RAB Under IS-856, Rel. 0

The initial release of IS-856 is referred to as Release 0 (Rel. 0), while a subsequent revision is referred to as Revision A (Rev. A). This subsection relates to how EV-DO access terminals use the RAB in EV-DO networks that operate according to Rel. 0, while the next subsection relates to how EV-DO access terminals use the RAB in EV-DO networks that operate according to Rev. A. Note that some EV-DO networks may provide both Rel. 0 and Rev. A service; that is, a given EV-DO network may provide service to access terminals that operate according to Rel. 0, and also to access terminals that operate according to Rev. A.

Under Rel. 0, access terminals can transmit data to access nodes on the reverse link at five different data rates: 9.6 kilobits per second (kbps), 19.2 kbps, 38.4 kbps, 76.8 kbps, and 153.6 kbps. Transmission at these various data rates involves using different types of coding for the data to be transmitted, among other differences. Note that, during a given instance of an access terminal transmitting data to an access node, the access terminal typically starts out using the lowest of those data rates, 9.6 kbps.

Recall that the EV-DO reverse link is essentially a CDMA channel over which the access terminal transmits data to the access node. And the access terminal does so in units of time known as frames, each of which last approximately 26.67 ms, which is the length of time of 16 timeslots on the forward link. And the network is synchronized on CDMA time, such that sets of 16 timeslots on the forward link will be aligned along reverse-link-frame time boundaries.

So, the EV-DO access terminal will transmit its first frame to the access node at 9.6 kbps. And then, for the next frame, the access terminal will stay at that rate, or perhaps transition up to 19.2 kbps. From there, frame by frame for all subsequent frames, the access terminal will transmit at the rate that it is currently using, transition up to the next-higher rate, or transition down to the next-lower rate. Note that rate-setting frequencies other than every frame, such as every other frame or perhaps every four frames, could be used as well. These (in this example) frame-by-frame decisions to maintain or change the reverse-link data rate are controlled by the RAB and by a table of reverse-link transitional probabilities that are stored by each access terminal. This table is typically sent from the access node to the access terminal during the session-setup process, though it can also be sent (or updated) as new air-interface connections are made between the access node and the access terminal, or perhaps periodically, or perhaps in response to some other event.

The table typically contains eight probabilities, each expressed as an integer between 0 and 255, as explained more fully below. The eight probabilities correspond to the eight possible transitions among the five possible data rates. So, the transitional probabilities correspond to transitioning (in kbps) (1) from 9.6 up to 19.2, (2) from 19.2 up to 38.4, (3) from 38.4 up to 76.8, (4) from 76.8 up to 153.6, (5) from 153.6 down to 76.8, (6) from 76.8 down to 38.4, (7) from 38.4 down to 19.2, and (8) from 19.2 down to 9.6.

Typically, when an access terminal is at the start of transmitting a given frame at a given data rate (say, 38.4 kbps), the access terminal checks the RAB. If the RAB is cleared (i.e. equal to 0), the RNR in the sector is not above the RNR threshold, and thus the access terminal knows that it has two options with respect to the next frame: stay at 38.4 kbps or move up to 76.8 kbps. To determine which of those options the access terminal will take for the next frame, the access terminal generates a random integer between 0 and 255, and compares that random integer with the appropriate transitional probability. In this example, the access terminal would compare the random integer with the 38.4-kbps-to-76.8-kbps value.

If the random integer is less than or equal to the 38.4-kbps-to-76.8-kbps table value, the access terminal will transition up to 76.8 kbps for the next frame. If not, the access terminal will stay at 38.4 kbps for the next frame. The table value is thus a representation of a probability, since the integer that the access terminal compares with the table value is randomly generated.

If, say, the table value were 255, the access terminal would have a probability of 1.00 (100%) for moving up to the next-higher data rate; if the table value were 0, the access terminal would only have a 1/256 probability of moving up. And so on.

If the RAB is set (again, equal to 1), however, the access node has decided that there is too much reverse noise on the sector-carrier at the moment, and thus the access terminal knows that it has two options with respect to the next frame. Again using 38.4 kbps as an example of the access terminal's current rate, the two options are to stay at 38.4 kbps or move down to 19.2 kbps. To determine which of those options the access terminal will take for the next frame, the access terminal again generates a random integer between 0 and 255, and compares that random integer with the appropriate reverse-link transitional probability. This time, the access terminal would compare the random integer with the 38.4-kbps-to-19.2-kbps value.

As with transitions up to higher data rates, when talking about transitions down to lower data rates, the access terminal checks whether the random integer it generates is less than or equal to the 38.4-to-19.2 table value. If so, the access terminal will transition down to 19.2 kbps for the next frame. If not, the access terminal will stay at 38.4 kbps for the next frame. Again, the table value represents a probability, as the integer that the access terminal compares with the table value is randomly generated. If, the table value were 255, the access terminal would have a probability of 1.00 (100%) for moving down to the next-lower data rate; if the table value were 0, the access terminal would only have a 1/256 probability of moving down. And so on.

5. Access Terminals Using the RAB Under IS-856, Rev. A

As explained above, under Rev. 0, reverse-link data rates are permitted only to increase or decrease by one step at a time (i.e. up to the next-higher data rate or down to the next-lower data rate), controlled by the RAB and the tables of reverse-link transitional probabilities. Under Rev. A, however, a more dynamic, iterative, equation-based approach is utilized, which permits data rates to change more rapidly. This approach is covered in IS-856, Rev. A, which is hereby incorporated herein by reference, in its entirety, as is IS-856, Rel. 0.

Briefly, under Rev. A, the access node still repeatedly transmits a RAB equal to 0 or 1.

Each individual access terminal then uses that value to compute what are known as a Quick Reverse Activity Bit (QRAB) and a Filtered Reverse Activity Bit (FRAB). The QRAB is binary (equal to 0 or 1), while the FRAB is a real number having a value anywhere between −1 and 1 inclusive. The QRAB is a short-term, binary indication of loading: a QRAB of 1 is associated with congestion on the sector-carrier, while a QRAB of 0 is associated with non-congestion. The FRAB is more of a long-term, continuous, historical value, where values closer to −1 indicate a lower degree of congestion on the sector-carrier reverse link, while values closer to 1 indicate a higher degree of congestion on the sector-carrier reverse link. Thus, both the QRAB and the FRAB reflect the access terminal's interpretation of the RAB from the access node.

The access terminal then calculates a value known in Rev. A as "T2PInflow." T2PInflow is an iterative value: prior to each reverse-link transmission, it has a current value, and that current value is one of the inputs in determining its value in the next calculation. Note that the "T2P" prefixes to many of the value and function names in this explanation means "Traffic to Pilot," as one governing principle that drives the determination of reverse-link data rates under Rev. A is the relative values of (1) the power level that the access terminal is using to transmit on the reverse-link portion of the traffic channel and (2) the power level at which the access terminal is detecting the pilot signal from the access node, as is known in the art.

Rev. A defines two functions called "T2PDn(.)" and "T2PUp(.)," both of which are functions of the current T2PInflow, FRAB, and a filtered value of the serving sector pilot strength. If the access terminal sets QRAB to 1 (corresponding to a relatively congested sector-carrier), then T2PInflow will be decremented by the result of T2PDn(.); if, on the other hand, the access terminal sets QRAB to 0 (corresponding to a relatively non-congested sector-carrier), then T2PInflow will be incremented by the result of T2PUp(.). As with all of the details of these computations, the detailed equations can be found in IS-856, Rev. A.

Under Rev. A, this updated T2PInflow value is then used as one of the inputs in what is referred to as a "token bucket" mechanism, which is used to determine a packet size for the next reverse-link transmission. And it is this packet size that essentially determines the reverse-link data rate at which the access terminal will be transmitting, based on a table that correlates packet sizes to data rates. In general, the token bucket mechanism is used as a regulator, to provide data-rate stability over time, while still permitting some instantaneous deviation.

One of the parameters of the token bucket mechanism is the "BucketLevel." Using that value, the updated T2PInflow, and the FRAB, the access terminal calculates a value known as "PotentialT2POutflow." The access terminal also maintains a data queue for outgoing data (i.e. data that is ready and waiting to be transmitted to the access node on the reverse link). The access terminal keeps track of the current size of this data queue in a variable referred to here as the "data queue size." The access terminal determines the packet size for the next transmission based on PotentialT2POutflow, the data queue size, other constraints and maximum/minimum allowed values, and the access terminal's transmission power.

As stated, the computed packet size essentially determines the reverse-link data rate. Under IS-856, Rev. A, effective reverse-link data rates can range from 19.2 kbps up to 1.84 megabits per second (Mbps). As a final part of the calculation, the access terminal computes a value known as "T2POutflow" (also referred to as "actual T2POutflow") based on the computed packet size. The access terminal then updates the BucketLevel with the updated T2PInflow value and the newly-calculated (actual) T2POutflow value, so that the BucketLevel will be ready for the next iteration.

OVERVIEW

As explained, EV-DO access terminals use the value of the RAB in different ways under IS-856, Rel. 0 and IS-856, Rev. A for determining their reverse-link data rates. However, under both standards, access nodes make repeated, periodic broadcasts of the RAB (equal to 0 or 1) on a given sector-carrier, and the access terminals operating on that sector-carrier interpret the RAB by maintaining or increasing their reverse-link data rates when the RAB is clear, and maintaining or decreasing their reverse-link data rates when the RAB is set. As also explained, in current implementations, the trigger for setting or clearing the RAB is how the current level of RNR on a given sector-carrier compares with an RNR threshold for that sector-carrier.

Further with respect to communication on the reverse link, current implementations of EV-DO wireless networks implement an error-detection-and-correction scheme known as and referred to herein as Hybrid ARQ (HARQ), where ARQ stands for Automatic Repeat Request. In general, HARQ is known in the art of wireless communications, and on the reverse link involves an access terminal sending packets to an access node a set number of times (e.g. four (i.e. a four-slot interlacing structure)), where, for each transmission attempt of each packet, the access node responds to the access terminal with either an acknowledgment (ACK) (indicating successful receipt/decoding) or a negative acknowledgement (NACK) (indicating failure to successfully receive/decode (e.g. receipt with one or more errors)).

If the access terminal receives an ACK from the access node in response to, for example, the second or third attempt at transmitting a given packet to the access node, the access terminal will not proceed with the additional attempts up to four, but rather will free up the next time slot for the first attempt for the next packet. In general, in this four-slot interlacing structure, transmit slots on the reverse link and ACK/NACK slots on the forward link are offset so that the access terminal can determine how to use the next transmit slot upon receipt of an ACK or NACK. The early termination of a four-attempt cycle upon receipt of an ACK increases overall throughput (i.e. effective data rate) on the reverse link as compared with a scheme that would always use all four slots for every packet.

In general, an access node sending relatively a low number of NACKs to an access terminal (or collectively to multiple access terminals) (i.e. a "good HARQ response" as used herein) on a sector-carrier is indicative of relatively favorable reverse-link conditions on the sector-carrier; correspondingly, an access node sending a high number of NACKs to an access terminal (or collectively to multiple access terminals) (i.e. a "poor HARQ response" as used herein) on a sector-carrier is indicative of relatively unfavorable reverse-link conditions on the sector-carrier, at least for that access terminal (or collectively for that group of access terminals).

According to the present methods and systems, if an access node detects that it is giving a poor HARQ response (e.g.

more than a set (i.e. threshold) number of NACKs) over a given time period with respect to a select group of one or more access terminals, the access node responds by (1) setting the RAB and (2) instructing that select group to ignore the RAB. Thus, better service may be provided to the select group of access terminals on the reverse link, which may comport with that select group having subscribed to some sort of preferred or premium level of service. As a result of the access node's two-part response, the access terminals in the select group can increase their reverse-link data rates (and thus transmission power) while other access terminals on the sector-carrier are maintaining or lowering their reverse-link data rates (and thus transmission power), thereby providing better absolute and relative service to the select group of access terminals, which may be referred to herein at times as "QoS access terminals."

The access node may instruct the QoS access terminal(s) to ignore the RAB with a broadcast or direct message. Essentially then, the QoS access terminal(s) behave as if the RAB is cleared, while all other access terminals operating on the sector-carrier operate as if the RAB is set (which in actuality it is). In some embodiments, the access node may clear the RAB upon detecting a good HARQ response for the QoS access terminal(s), perhaps requiring that good HARQ response to persist for a threshold time period.

And it should be noted that the above overview is illustrative and not limiting. That is, additional and/or different features may be present in some embodiments of the present invention. It should be noted as well that any description of an access node and/or one or more access terminals communicating according to EV-DO is by way of example, and that any suitable modes (e.g. protocols) may be used instead, such as CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Exemplary Architecture

Figure 1:
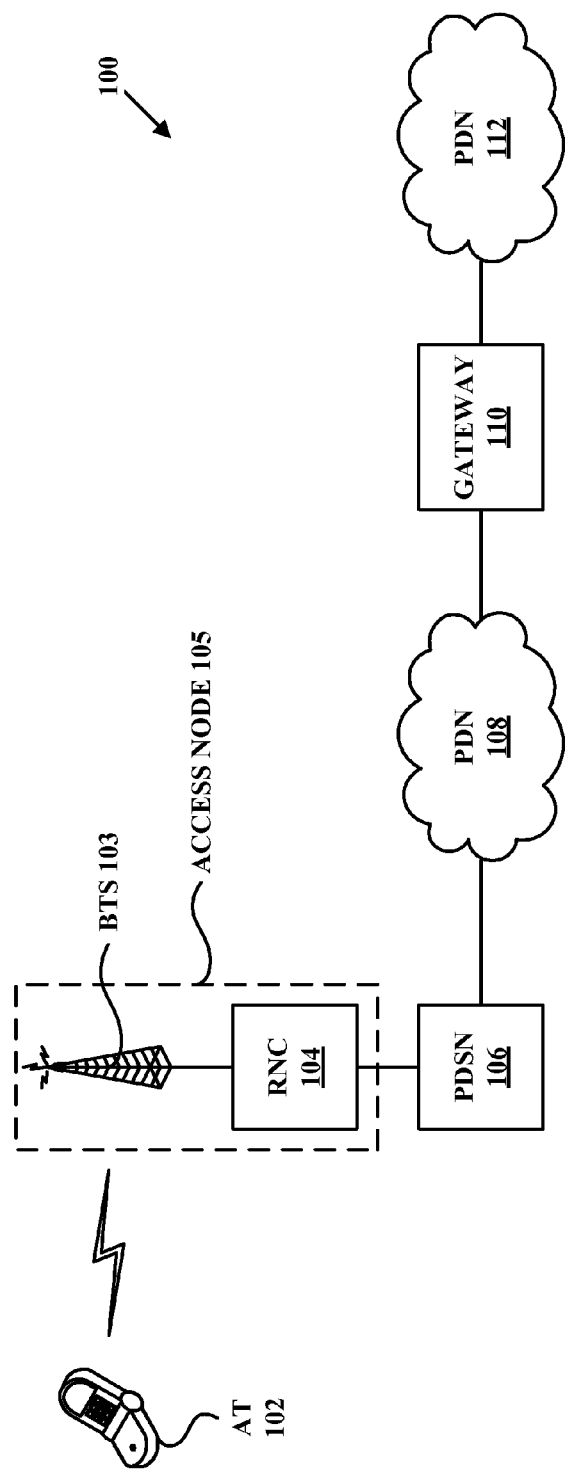
FIG. 1 depicts a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node 105 (shown as comprising a BTS 103 and an RNC 104), a PDSN 106, a packet-data network (PDN) 108, a gateway 110, and a PDN 112. And additional entities not depicted could be present as well. For example, there could be more than one access terminal in communication with access node 105; also, there could be additional entities in communication with PDN 108 and/or PDN 112. Also, there could be one or more routers, switches, other devices and/or networks making up at least part of one or more of the communication links.

Access terminal 102 may be any device arranged to carry out the access-terminal functions described herein, and may include a user interface, a wireless-communication interface, a processor, and data storage comprising instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1xRTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

BTS 103 may be any one or any combination of network elements arranged to carry out the BTS functions described herein, and may include a communication interface, a processor, and data storage comprising instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection), such as an Ethernet interface, for communicating with RNC 104. RNC 104 may be any one or any combination of network elements arranged to carry out the RNC functions described herein. As such, RNC 104 may include a communication interface, a processor, and data storage comprising instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond. Note that access node 105 may comprise BTS 103 and RNC 104, and may comprise one or more additional BTSs as well. In general, access node 105 provides wireless service to access terminals over an air interface, and uses a backhaul connection to provide transport service over PDN 108 (or perhaps PDN 108 and PDN 112) to those access terminals.

PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are certainly possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

2. Exemplary Operation

Figure 2:
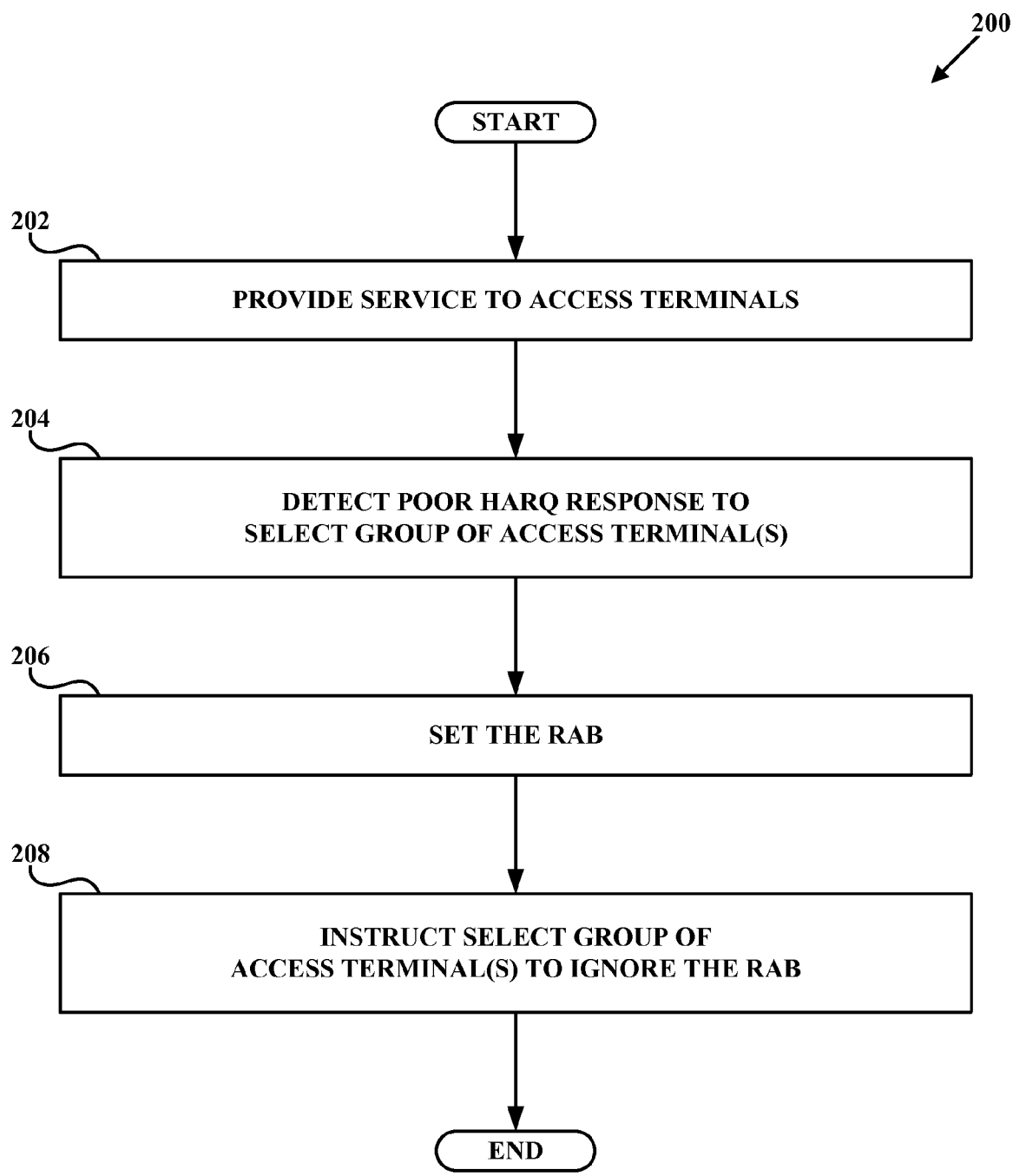
FIG. 2 depicts a flowchart of a method, in accordance with exemplary embodiments.

FIG. 2 depicts an exemplary method that may be carried out by an access node such as access node 105. And although method 200 is described herein as being carried out by access node 105, this is not required; in general, method 200 may be carried out by an access node, a BTS, an RNC, a PDSN, one or more other network entities, or some combination thereof.

At step 202, access node 105 provides service to a plurality of access terminals in a first wireless coverage area (such as a cell or a sector). As stated above, access node 105 may include an RNC and at least one BTS, and may be an EV-DO access node, providing service that is compliant with at least one of IS-856, Release 0 and IS-856, Revision A. The plurality of access terminals, which may be EV-DO access nodes, includes a select group of one or more access terminals, each of which may be subscribed to a premium level of service.

At step 204, access node 105 detects that, over a given first time period (which may be configurable), access node 105 has sent more than a first threshold number (which again may be configurable) of HARQ NACKs with respect to reverse-link communication of the select group, and responsively carry out steps 206 and 208, which are described below.

At step 206, access node 105 sets the RAB (which can be set or cleared) for the first wireless coverage area.

At step 208, access node 105 instructs the select group of access terminals to ignore the RAB being set, which the access terminals in the select group responsively do, while the rest of the access terminals that are in the plurality but not in the select group obey the RAB being set. A given access terminal ignoring the RAB being set has the options of maintaining or increasing its reverse-link data rate, while a given access terminal obeying the RAB being set has the options of maintaining or decreasing its reverse-link data rate. Note that access node 105 instructing the select group of access terminals to ignore the RAB being set may involve access node 105 broadcasting a message in the first wireless coverage area and/or sending a respective message directly to each access terminal in the select group.

In some embodiments, access node 105 may detect that it has, over a given second time period, sent less than a second threshold number of HARQ NACKs with respect to reverse-link communication of the select group, and responsively clear the RAB. The first time period may be equal or not equal in duration to the given second time period, and the first threshold number of HARQ NACKs may be equal or not equal to the second threshold number of HARQ NACKs.

3. Conclusion

Various exemplary embodiments have been described above. Those skilled in the art will understand, however, that changes and modifications may be made to those examples without departing from the scope of the claims.

The invention claimed is:

1. A method comprising:
    an access node providing service to a plurality of access terminals in a first wireless coverage area, the plurality of access terminals comprising a select group of one or more access terminals; and
    the access node detecting that, over a given first time period, the access node has sent more than a first threshold number of Hybrid ARQ (HARQ) negative acknowledgements (NACKs) with respect to reverse-link communication of the select group, and responsively:
        setting a reverse activity bit (RAB) for the first wireless coverage area; and
        instructing the select group of access terminals to ignore the RAB being set, wherein the access terminals in the select group responsively ignore the RAB being set, and wherein the access terminals in the plurality but not in the select group obey the RAB being set.

2. The method of claim 1, wherein the access node comprises a radio network controller (RNC) and at least one base transceiver station (BTS).

3. The method of claim 1, wherein the access node is an EV-DO access node, and wherein the access terminals are EV-DO access terminals, and wherein the service is compliant with at least one of IS-856, Release 0 and IS-856, Revision A.

4. The method of claim 1, wherein the first wireless coverage area is a cell or a sector.

5. The method of claim 1, wherein the select group consists of one access terminal.

6. The method of claim 1, wherein the select group comprises more than one access terminal.

7. The method of claim 1, wherein each access terminal in the select group is subscribed to a premium level of service.

8. The method of claim 1, wherein the RAB can be set or cleared, wherein a given access terminal ignoring the RAB being set has the options of maintaining or increasing a reverse-link data rate for the given access terminal, and wherein a given access terminal obeying the RAB being set has the options of maintaining or decreasing a reverse-link data rate for the given access terminal.

9. The method of claim 1, wherein instructing the select group of access terminals to ignore the RAB being set comprises broadcasting a message in the first wireless coverage area.

10. The method of claim 1, wherein instructing the select group of access terminals to ignore the RAB being set comprises sending a respective message directly to each access terminal in the select group.

11. The method of claim 1, further comprising the access node detecting that, over a given second time period, the access node has sent less than a second threshold number of HARQ NACKs with respect to reverse-link communication of the select group, and responsively clearing the RAB.

12. The method of claim 11, wherein the given first time period is equal in duration to the given second time period.

13. The method of claim 11, wherein the given first time period is not equal in duration to the given second time period.

14. The method of claim 11, wherein the first threshold number of HARQ NACKs is equal to the second threshold number of HARQ NACKs.

15. The method of claim 11, wherein the first threshold number of HARQ NACKs is not equal to the second threshold number of HARQ NACKs.

16. An access node comprising:
a communication interface comprising a wireless-communication interface;
a processor; and
data storage comprising instructions executable by the processor for causing the access node to carry out functions including:
providing service to a plurality of access terminals in a first wireless coverage area, the plurality of access terminals comprising a select group of one or more access terminals; and
detecting that, over a given first time period, the access node has sent more than a first threshold number of Hybrid ARQ (HARD) negative acknowledgements (NACKs) with respect to reverse-link communication of the select group, and responsively:
setting a reverse activity bit (RAB) for the first wireless coverage area; and
instructing the select group of access terminals to ignore the RAB being set, wherein the access terminals in the select group responsively ignore the RAB being set, and wherein the access terminals in the plurality but not in the select group obey the RAB being set.

17. The access node of claim 16, wherein the access node comprises a radio network controller (RNC) and at least one base transceiver station (BTS).

18. The access node of claim 16, wherein the access node is an EV-DO access node, and wherein the access terminals are EV-DO access terminals, and wherein the service is compliant with at least one of IS-856, Release 0 and IS-856, Revision A.

19. The access node of claim 16, wherein the first wireless coverage area is a cell or a sector.

20. The access node of claim 16, wherein the select group consists of one access terminal.

21. The access node of claim 16, wherein the select group comprises more than one access terminal.

22. The access node of claim 16, wherein each access terminal in the select group is subscribed to a premium level of service.

23. The access node of claim 16, wherein the RAB can be set or cleared, wherein a given access terminal ignoring the RAB being set has the options of maintaining or increasing a reverse-link data rate for the given access terminal, and wherein a given access terminal obeying the RAB being set has the options of maintaining or decreasing a reverse-link data rate for the given access terminal.

24. The access node of claim 16, the instructions for instructing the select group of access terminals to ignore the RAB being set comprise instructions for carrying out at least one of (1) broadcasting a message in the first wireless coverage area and (2) sending a respective message directly to each access terminal in the select group.

25. The access node of claim 16, the data storage further comprising instructions for detecting that, over a given second time period, the access node has sent less than a second threshold number of HARQ NACKs with respect to reverse-link communication of the select group, and responsively clearing the RAB.

* * * * *